3,570,106
METHOD FOR PRODUCING SEAMLESS REFRACTORY METAL TUBING

James A. McGurty and Charles O. Tarr, Cincinnati, Ohio, assignors to the United States of America as represented by the United States Atomic Energy Commission
No Drawing. Filed Apr. 1, 1969, Ser. No. 812,435
Int. Cl. B23p 17/00
U.S. Cl. 29—423     4 Claims

ABSTRACT OF THE DISCLOSURE

A method for producing seamless refractory metal tubing is provided which utilizes a composite core filler disposed coaxially within a billet of primary refractory metal from which the tubing is to be formed. The composite core filler comprises an outer core portion which is compatible with the working and metallurgical characteristics of the primary refractory metal, and an inner core portion disposed coaxially within the outer portion. The inner core portion is selected from materials easily removed by chemical leaching. Following an extrusion operation, the inner core portion is first removed through chemical leaching in order to provide an axial passage along the entire length of the outer core portion. The outer core portion is then removed by flowing chemicals through the axial passage formed by removing the inner core portion.

BACKGROUND OF THE INVENTION

The invention described herein relates generally to tubing fabrication and more particularly to the production of seamless refractory metal tubing using chemical leaching techniques. It was developed in the course of, or under, a contract with the U.S. Atomic Energy Commission.

In some advanced nuclear reactors which are designated to operate at high temperatures, it has been found necessary to provide the fissionable fuel contained therein with refractory metal claddings. One typical fuel configuration, referred to as the pin type, is characterized by small cylindrically shaped fuel pellets disposed within a thin walled, small diameter metal tube which acts as cladding. Large quantities of such tubing are required in a typical reactor core using pin-type fuel elements. The cladding must be of uniform thickness to prevent hot spots and of high integrity to prevent leakage of gaseous fission products during reactor operation.

Hot extrusion or other hot working techniques are applied in the production of thin walled tube of refractory metals such as tungsten, rhenium, tantalum, tungsten plus rhenium, and tungsten-molybdenum-rhenium alloys. Such techniques necessitate the provision of a metal core filler inside the refractory metal billet or blank being extruded. The metal core filler must be compatible with the working and metallurgical characteristics of the billet being extruded to ensure a successful extrusion. Following the extrusion, the filler material must be removed to complete the tube forming operation. This removal requirement has long constituted a barrier in the development of a practical method of producing seamless refractory metal tubing.

Removing the filler material using machining techniques limits the length of the tubing to about two feet and presents a very difficult machining operation because of straightness requirements in the finished tubing. Chemical leaching of the core filler material, although workable with tubes of longer lengths than can be produced by machining the filler material, has heretofore been an impractically slow technique because of the low leaching rate achievable with filler materials possessing the desired working and metallurgical characteristics. The low leaching rate of the filler material is aggravated by the very small cross section of filler material which in effect limits the total surface area exposed to the leaching chemicals at any given time. The combination of a low leaching rate and small exposed area results in an impractically slow removal of the filler material. Unfortunately, available filler materials characterized by higher leaching rates have been found otherwise undesirable in that they are metallurgically incompatible with the primary refractory tube material or lack the necessary working properties for a successful extrusion. Extrusion with a metallurgically incompatible filler material has produced various undesirable resutls such as: contamination of the refractory tube metal, eutectic melting, interdiffusion and other metallurgical reactions between the filler material and tube metal.

It is, accordingly, a general object of the invention to provide a method of producing long, small diameter, thin walled, seamless, refractory metal tubing.

Another object of the invention is to provide a method of rapidly producing long, small diameter, thin walled, seamless, refractory metal tubes using chemical leaching to remove filler materials.

SUMMARY OF THE INVENTION

In accordance with the invention, a method for rapidly producing seamless refractory metal tubing is provided. A composite core of filler material is disposed coaxially within a billet of primary refractory metal from which tubing is to be formed. The composite core comprises an outer core portion which is compatible with the metallurgical and working characteristics of the primary refractory metal, and an inner core portion disposed coaxially with the outer core portion and selected from materials easily removed by chemical leaching. Following an extrusion operation, the inner core portion is first removed through chemical leaching in order to provide an axial passage along the entire length of the outer core portion. The outer core portion is then removed from within the extruded tube of refractory metal by passing chemical leaching agents through the axial passage formed earlier by removing the inner core portion. Thus a filler material may be selected for the outer core portion based upon its metallurgical and working properties rather than its susceptibility to rapid chemical leaching inasmuch as the passageway provided by removing the inner core portion exposes a large surface area of the outer core portion to the action of a chemical leaching agent. Moreover, the leaching rate of the outer core portion increases as leaching increases the diameter of the pasageway.

DESCRIPTION OF THE PREFERRED EMBODIMENT

A method for producing seamless refractory metal tubing is provided wherein a composite core of filler material is used to facilitate chemical leaching following an extrusion operation. The composite core, which is designed to be co-extruded with a blank of primary tubing metal, comprises an annular outer core portion and a cylindrical inner core portion disposed coaxially within the outer core portion. The blank of primary tubing metal is also annular in shape and is disposed concentrically about the annular outer core portion prior to an extrusion operation.

The main requirements which must be met in selecting a material for the outer core portion are that it be compatible with the metallurgical and working characteristics of the primary tubing metal. Failure to satisfy these requirements has produced the undesirable results previously discussed under the background portion of the application.

Unfortunately, in the case of some refractory metals which are highly desirable for use as fuel element cladding, those materials which possess the desired compatible metallurgical and working characteristics required of filler material have such a low susceptibility to chemical leaching that their removal is impractically slow using conventional leaching techniques. By using the method of this invention, however, tubing may be rapidly produced even though the material of the outer core portion has a low susceptibility to chemical leaching.

The inner core portion, being physically separated from the primary tubing material by the outer core portion, does not have to be compatible with the metallurgical characteristics of the primary tubing material. It is selected, rather, primarily on its being readily susceptible to chemical leaching and compatible with the working characteristics of the primary tubing material.

Thus, by providing a composite core of filler materials, each of the core materials may be lacking in some characteristic or property which would be otherwise required if only a single core filler material were used in a conventional manner. The outer core portion can be made from materials having a low susceptibility to chemical leaching and the material of the inner core portion need not be metallurgically compatible with the primary tubing material.

In a tube producing operation performed in accordance with the invention, a composite core as described above is co-extruded with a blank of primary tubing metal to form a long thin rod. The rod comprises a thin outer cladding of primary tubing material encompassing an elongated composite core of filler material as described above but elongated as a result of the extrusion. Removal of the composite core must then be accomplished to provide a tube or cladding of primary tubing material. According to the invention, the composite core is rapidly removed from the extruded rod by first chemically leaching the material of the inner core portion to form an axial passageway along the length of the rod. Since the material of the inner core portion is selected from materials having a high susceptibility to chemical leaching, the material in that core portion can be rapidly removed. Although the material of the remaining outer core portion has a low susceptibility to chemical leaching, it can nevertheless be removed in a relatively rapid manner by chemical leaching because of its relatively large surface area exposed to the leaching chemicals which are flowed through the passageway formed by removing the inner core portion. Since the overall leaching rate is proportional to the exposed suface subject to chemical attack, a multifold increase in the overall leaching rate is provided by such passageway as compared to conventional leaching techniques. As leaching of the outer core portion progresses and the axial passageway increases in diameter, the leaching rate is further accelerated due to the progressively increased surface area defining the passageway and the increased flow capacity of the passageway for leaching chemicals.

Example

A tube of tungsten-30 renium-30 molybdenum alloy was produced according to the present method using a composite core of molybdenum and hafnium. Molybdenum was chosen as the material for the outer core portion because previous work had shown it to be an accepetable core filler for tungsten and several tungsten-rhenium alloys from the standpoint of compatible metallurgical and working characteristics. Molybdenum alone has not been suitbale as a core filler material because of its resistance to chemical leaching. Hafnium was chosen as the inner core portion because it is easily removed by chemical leaching, compatible with the molybdenum used in the outer core portion, and the fact that it remains solid at the 1760° C. extrusion temperature of the primary tube material. A 0.550 in. outside diameter, 0.375 in. inside diameter test piece of tungsten-30 rhenium-30 molybdenum alloy was fitted with a composite core of molybdenum and hafnium. The molybdenum insert was annular in shape with an outside diameter of 0.374 in. to match the inside diameter of the test piece and an inside diameter of 0.187 in. for receiving a hafnium insert. The cylindrical hafnium insert had a diameter of 0.186 in.

The entire nested assembly of test piece, molybdenum and hafnium inserts was then extruded at a temperature of 1760° C. to provide a composite bar or rod with a diameter of 0.173 in. Following the extrusion operation, the hafnium insert was selectively leached from the rod by directing a flow of concentrated hydrofluoric acid through a small tantalum tube against the end of the hafnium insert. Hydrofluoric acid was selected to remove the hafnium because it reacts very slowly with molybdenum. The molybdenum in the outer core thus acts as a protective liner for the test piece while the hafnium is being removed. The hafnium was removed at the rate of 2 inches per hour during this initial test although, during later tests, removal rates of up to 5 inches per hour were achieved. During the hafnium leaching process, the test piece was coated with an organic material (vinyl rubber tape) to prevent acid attack on that surface. After a passageway had been provided throughout the length of the molybdenum core filler material by removing the hafnium, the molybdenum was then removed by pumping nitric acid through the passageway. Nitric acid removed the molybdenum in a free flow at a sufficiently uniform and rapid rate that the interior face of the test piece was unaffected by the leaching action. Conventional acid pumps were used throughout the test for the movement of acids.

The end results of the present method are that a small diameter, seamless, refractory metal tube is made without restriction as to length or straightness and at a practical rate.

Although applicants refer to tungsten and tungsten alloys as the tubing materials of interest, it will be apparent to those skilled in the art that applicants' invention may be applied in any case where the only filler materials which are compatible with the metallurgical and working characteristics of the primary tube material are not readily leached following an extrusion. To the extent that such primary tubing materials exists, applicants' invetnion may be applied by designing a composite filler core using the same considerations as described above and removing the core using the same leaching technique.

Thus, the particular tubing materials, filler materials and acids referred to above should not be considered in a limiting sense and the scope of the invention should be determined solely by the accompanying claims.

What is claimed is:

1. A method for producing seamless refractory metal tubing comprising:
   (a) inserting a composite core filler coaxially within a billet of primary refractory metal from which said tubing is to be formed, said composite core filler comprising an outer core portion which is compatible with the working and metallurgical characteristics of the primary refractory metal, and an inner core portion, readily removable by chemical leaching, disposed coaxially within said outer core portion;
   (b) hot extruding said billet together with said composite core insert;
   (c) selectively removing said inner core portion by chemical leaching to form an axially extending passageway through said outer core portion; and
   (d) removing said outer core portion by flowing chemicals suitable for leaching said outer core portion through said passageway formed by removing said inner core portion.

2. The method of claim 1 wherein said refractory metal is tungsten-30 rhenium-30 molybdenum alloy.

3. The method of claim 1 wherein said refractory metal is tungsten-30 rhenium-30 molybdenum alloy, said outer core portion is molybdenum, and said inner core portion is hafnium.

4. The method of claim 3 wherein said hafnium is leached with hydrofluoric acid and said molybdenum is leached with nitric acid.

References Cited

UNITED STATES PATENTS

| | | | |
|---|---|---|---|
| 1,461,018 | 7/1923 | Armstrong | 29—423 |
| 2,300,353 | 10/1942 | Eberhardt | 29—423 |
| 2,836,884 | 6/1958 | Graham | 29—423 |
| 3,201,856 | 8/1965 | Keegan et al. | 29—423X |
| 3,205,692 | 9/1965 | Kemppinen et al. | 29—423X |

JOHN F. CAMPBELL, Primary Examiner

V. A. DI PALMA, Assistant Examiner

U.S. Cl. X.R.

72—273